United States Patent [19]

Hocker et al.

[11] 4,384,090
[45] May 17, 1983

[54] PROCESS FOR PRODUCING POLYACETYLENE

[75] Inventors: Jürgen Hocker, Bergisch-Gladbach, Fed. Rep. of Germany; Wolfgang Wieder, Lillebonne, France; Rudolf Merten, Leverkusen; Josef Witte, Cologne, both of Fed. Rep. of Germany

[73] Assignee: Bayer Aktiengesellschaft, Leverkusen, Fed. Rep. of Germany

[21] Appl. No.: 288,886

[22] Filed: Jul. 31, 1981

[30] Foreign Application Priority Data

Aug. 9, 1980 [DE] Fed. Rep. of Germany ....... 3030193

[51] Int. Cl.³ .................................... C08F 4/68
[52] U.S. Cl. ................................... 526/169.2
[58] Field of Search .................. 526/169.2, 285

[56] References Cited

U.S. PATENT DOCUMENTS

| | | | |
|---|---|---|---|
| 3,119,799 | 1/1964 | Natta | 526/169.2 |
| 3,205,205 | 9/1965 | Adams | 526/285 |
| 3,299,016 | 1/1967 | Sonnenfeld | 526/285 |
| 3,674,755 | 7/1972 | Yamamoto | 526/169.2 |
| 4,173,698 | 11/1979 | Kanoh | 526/169.2 |

FOREIGN PATENT DOCUMENTS 1149218 of 1957 France.

OTHER PUBLICATIONS

Journal of Polymer Science: Polymer Chemistry Edition, vol. 12, 11-20 (1974).

*Primary Examiner*—Paul R. Michl
*Attorney, Agent, or Firm*—Connolly and Hutz

[57] ABSTRACT

Process for the production of polyacetylene, wherein acetylene is polymerized in an organic diluent with the aid of an organometallic mixed catalyst based on a vanadium compound of the formula

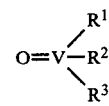

wherein
$R^1$ represents halogen (chlorine),
$R^2$ and $R^3$ represent halogen (chlorine), $OR^5$ ($R^5 = C_1-C_{20}$ alkyl, straight chain, cyclic or branched), whereby
$R^2$ and $R^3$ may be the same or different,
and on an luminium alkyl compound.

9 Claims, No Drawings

PROCESS FOR PRODUCING POLYACETYLENE

This invention relates to a process for the production of polyacetylene wherein a suspension of fibrous polyacetylene particles is produced primarily by polymerising acetylene in an organic suspending agent, with continuous thorough mixing, in the presence of an organometallic catalyst based on vanadium. When the suspending agent is removed from the suspension and the suspended particles are compacted, simultaneously a film or foil is obtained.

The polymerisation of acetylene using organometallic mixed catalysts is known. The Journal of Polymer Science, Volume 12, pages 11 to 20, describes the present state of the art. Polyacetylene is insoluble in all solvents and it is generally produced as a non-processible powder by the polymerisation of acetylene in organometallic mixed catalysts. The polymerisation of acetylene is generally carried out by introducing acetylene gas into a solution of an organometallic mixed catalyst in a solvent under anaerobic conditions. Suitable organometallic mixed catalysts, which are also known as Ziegler catalysts, are obtained by reacting a compound of one of the metals titanium, chromium, iron, cobalt or manganese (e.g. a halide, an ester or a salt with an organic acid) with an aluminium alkyl. This polymerisation process, which is generally carried out with vigorous and thorough mixing of the polymerisation medium, produces the polyacetylene in the form of a powder which cannot be further processed. In order to obtain polyacetylene in a useful form, for example, as a film, the thorough mixing has to be omitted and catalysts of the $Ti(OC_4H_9)_4/Al(C_2H_5)_3$ type, i.e. catalysts based on titanium compounds and aluminium alkyls, have to be used. If acetylene is passed over a solution of this catalyst in an organic solvent, then a polyacetylene film forms on the surface if agitation of the medium is carefully avoided. This film may be removed and examined. However, larger surfaces obviously cannot be produced in this manner and it is difficult to establish the thickness of the film.

According to the invention, it is possible to produce polyacetylene in the form of fibrous particles. In order to achieve this result, a solution of a specific organometallic catalyst is initially produced in an inert solvent and gaseous acetylene is introduced with vigorous intermixing. The catalyst which is used preferably consists of from 0.05 to 0.2 mols of a vanadium compound of the following formula

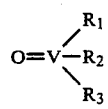

wherein
$R_1$ represents halogen (chlorine),
$R_2$ and $R_3$ represent halogen (chlorine) or $OR_5$ ($R_5 = C_1-C_{20}$-alkyl which may be straight chain, cyclic or branched), and
$R_2$ and $R_3$ are the same or different, with from 0.1 to 20, preferably from 1 to 10 mols of $Al(R_4)_3$, $AlX(R_4)_2$, $AlX_2(R_4)$ or $Al_2X_3(R_4)_3$,
wherein
$R_4$ represents $C_1-C_{12}$-alkyl, preferably methyl, ethyl, isobutyl or octyl, and X represents halogen.

Vanadium compounds which are particularly suitable are the following:

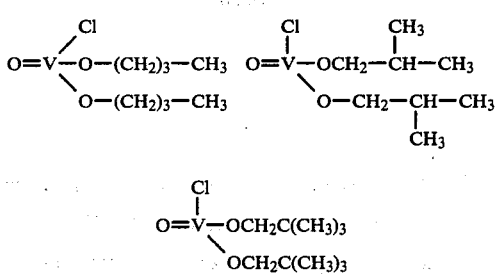

Aluminium alkyls which are particularly suitable are the following: triethyl aluminium, triisobutyl aluminium and trioctyl aluminium.

Solvents which are suitable are particularly hydrocarbons such as benzene, toluene, hexane, tetralin or decalin, and halogenated hydrocarbons such as methylene chloride or chlorobenzene.

The catalysts are produced in a known manner by reacting the vanadium compound and the aluminium compound in the solvent at temperatures of from $-100°$ to $+30°$ C. For the subsequent polymerisation process, solutions containing from 5 to 100 m mol of aluminium per liter of solvent are generally used. Acetylene is introduced into this solution under anaerobic conditions at temperatures of generally from $-100°$ to $+80°$ C., preferably from $-100°$ to $-30°$ C. During this process, a suspension of polyacetylene results. The suspended particles appear as small burrs under the microscope. As a result of filtering the polymerisation liquid off under vacuum (removed by suction), a cohesive covering is formed from these "burrs"; this is a film which may be removed from its substrate (filter paper).

PRODUCTION EXAMPLES 1.3 l of toluene are introduced into a 2 l glass beaker stirring apparatus and 300 ml of toluene are distilled off under a stream of nitrogen. 4 ml (2 m mols) of bis-(2,2-dimethylpropoxy)-vanadium oxychloride as a 0.5 molar solution in toluene and 20 ml (20 m mols) of aluminium triisobutyl as a 1 molar solution in toluene are added at $-78°$ C. (cooling with solid carbondioxide). During this procedure, the apparatus is maintained under a constant nitrogen stream. Pure acetylene is passed through for one hour with stirring at a rate of 10 l per hour. The polyacetylene is precipitated as a dark deposit which appears as dark-violet burrs under the microscope.

The reaction is terminated with 0.5 g of 4-methyl-2,6-di-tert.-butyl-phenol (Ionol) in 400 ml of absolute toluene, and the reaction mixture is blown out with nitrogen, whereby the temperature rises to 20° C.

The polyacetylene powder is removed by suction and is washed several times with toluene. During this procedure, a polyacetylene film forms on the filter paper and it is easily removed as a stable film after drying.

We claim:
1. Process for the production of polyacetylene, wherein acetylene is polymerized in an organic diluent, in the presence of an organometallic mixed catalyst which comprises
(a) a vanadium compound of the formula

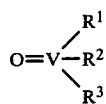

wherein $R^1$ represents halogen;

$R^2$ and $R^3$ may be the same or different and represent halogen or $OR^5$ wherein $R^5$ is $C_1$–$C_{20}$ alkyl which is straight chain, cyclic or branched; and (b) an aluminium alkyl compound.

2. Process according to claim 1 wherein $R^1$ is chloro.

3. Process according to claim 1 wherein $R^2$ or $R^3$ represent chloro.

4. The process according to claim 1 wherein the vanadium compound is

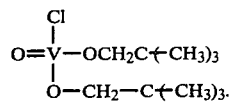

5. The process according to claim 1 wherein the aluminum alkyl is triethyl aluminum, triisobutyl aluminum or trioctyl aluminum.

6. The process according to claim 1 wherein halogen is chloro.

7. The process according to claim 1 wherein the organic diluent is selected from the group consisting of benzene, toluene, hexane, tetralin, decalin, methylene chloride and chlorobenzene.

8. The process according to claim 1 wherein the mixed catalyst contains 0.05 to 0.2 moles vanadium compound per 0.1 to 20 moles of aluminum alkyl compound.

9. The process according to claim 1 wherein the product polyacetylene is precipitated in particulate form and the particles are compacted into a film or foil.

* * * * *